(12) United States Patent
Montminy et al.

(10) Patent No.: US 7,683,934 B2
(45) Date of Patent: Mar. 23, 2010

(54) SYSTEM AND METHOD FOR AUTOMATIC CAMERA HEALTH MONITORING

(75) Inventors: Christian Joseph Eric Montminy, Ottawa (CA); Kenneth Edward Maughan, Ottawa (CA); Man-Yee Sun, Orleans (CA); Roger Francis MacLean, Ottawa (CA)

(73) Assignee: March Networks Corporation, Ottawa, Ontario (CA)

( * ) Notice: Subject to any disclaimer, the term of this patent is extended or adjusted under 35 U.S.C. 154(b) by 589 days.

(21) Appl. No.: 11/567,353

(22) Filed: Dec. 6, 2006

(65) Prior Publication Data

US 2007/0126869 A1   Jun. 7, 2007

Related U.S. Application Data

(60) Provisional application No. 60/742,519, filed on Dec. 6, 2005.

(51) Int. Cl.
*H04N 5/225* (2006.01)
(52) U.S. Cl. .................... 348/207.99; 348/143
(58) Field of Classification Search ............... 348/143, 348/207.99, 241; 382/103; 375/240.16
See application file for complete search history.

(56) References Cited

U.S. PATENT DOCUMENTS

| 3,781,468 | A | | 12/1973 | Chomet et al. |
| 5,455,561 | A | | 10/1995 | Brown |
| 5,841,251 | A | * | 11/1998 | Vroemen et al. ............ 348/181 |
| 6,297,844 | B1 | * | 10/2001 | Schatz et al. .................. 348/43 |
| 6,841,780 | B2 | | 1/2005 | Cofer et al. |
| 6,980,229 | B1 | * | 12/2005 | Ebersole, Jr. ................ 348/169 |
| 7,124,427 | B1 | * | 10/2006 | Esbensen .................... 725/109 |
| 2002/0054210 | A1 | * | 5/2002 | Glier et al. ................... 348/149 |
| 2002/0141617 | A1 | | 10/2002 | Yamashiro |
| 2004/0073321 | A1 | * | 4/2004 | Kondo .......................... 700/28 |
| 2005/0122397 | A1 | * | 6/2005 | Henson et al. .............. 348/143 |
| 2005/0134942 | A1 | * | 6/2005 | Kondo et al. ................ 358/479 |
| 2005/0162516 | A1 | | 7/2005 | Loepfe et al. |
| 2006/0036403 | A1 | * | 2/2006 | Wegerich et al. ............ 702/183 |

FOREIGN PATENT DOCUMENTS

| GB | 2408883 A | 6/2005 |
| WO | 2005109186 A2 | 11/2005 |

OTHER PUBLICATIONS

Harasse et al., "Automated Camera Dysfunctions Detection", IEEE Southwest Symposium on Image Analysis and Interpretation, Mar. 2004, pp. 36-40.

* cited by examiner

*Primary Examiner*—Tuan Ho
(74) *Attorney, Agent, or Firm*—Curtis B. Behmann; Borden Ladner Gervais LLP

(57) ABSTRACT

A system and method are provided for automatic camera health monitoring, such as for a camera in a video surveillance system. The system preferably provides substantially continuous monitoring and detection of camera malfunction, due to either external or internal conditions. Camera malfunction is detected when a computed camera health measurement exceeds a malfunction threshold. The camera health measurement is computed based on a comparison of a current camera health record to a plurality of stored camera health records obtained in a learning mode, which characterize known states of normal camera operation. Aside from monitoring camera health, methods of the present invention can also be used to detect an object being added to or removed from a scene, or to detect a change in lighting in a scene, possibly caused by a defective light fixture.

4 Claims, 5 Drawing Sheets

SYSTEM AND METHOD FOR AUTOMATIC CAMERA HEALTH MONITORING

CROSS REFERENCE TO RELATED APPLICATIONS

This application claims the benefit of priority of U.S. Provisional Patent Application Ser. No. 60/742,519 filed Dec. 6, 2005, which is incorporated herein by reference.

FIELD OF THE INVENTION

The present invention relates generally to device monitoring. More particularly, the present invention relates to an automated system for monitoring cameras in a video surveillance system and detecting a camera malfunction.

BACKGROUND OF THE INVENTION

Administrators of a large video surveillance system can have many thousands of cameras that are continuously recording. While much of this video is never viewed, some of it is very important to the administrator since it can hold evidence of an important event. When an event does occur, the administrator expects the video to be available from the camera(s) that observe the location of the event, in terms of field of view (FOV).

A problem that can occur is that the camera may not catch the intended event for a variety of camera malfunction conditions, either due to external or internal conditions. Externally caused camera malfunction conditions include: the camera may have been knocked from its original position and is no longer recording video of the field of view of the event; or the camera's field of view may have been obstructed, either intentionally through tampering (e.g. camera lens has been spray painted or covered up) or by accident (e.g. an object has been placed in front of the camera, blocking its view). Internally caused camera malfunction conditions result in a degraded image that is not useful evidence of the event, and can include: malfunctioning to the point where no signal is available (sync loss); focus being improperly adjusted, resulting in lack of details; camera iris setting being improperly adjusted, resulting in a white washed image; camera color being inaccurate, resulting in wrongly colored scene; camera signal being very noisy (e.g. due to 60 Hz noise or bad grounding of camera), resulting in loss of information from the scene due to noise; and camera signal level being too low, resulting in an image with lack of contrast.

For administrators of small video surveillance systems, it is possible to manually verify camera operation to determine whether a camera is malfunctioning. An administrator can periodically (e.g. on a weekly basis) verify each camera in the system to ensure that it is properly positioned and operating properly. For administrators of a large network of digital video recorders, this method is usually not feasible since it is too time consuming. The administrator generally assumes that all cameras are operating properly, and only learns of issues when it is too late, e.g. an event occurred and the video was not available. While care is taken when cameras are installed to ensure that they are pointing at the proper area of interest and operating properly, this is not often verified after installation. This is due to the often very large number of cameras, and the time it would take to periodically verify their proper operation manually.

Automated solutions to try to address this problem have been suggested, but they are generally specific to detecting a given camera problem. For example, an automated method exists to detect a camera lens that has been spray painted, or to perform "black screen" detection for obstruction detection, but such methods do not detect any other types of failures or malfunctions. Another known approach can detect changes in the field of view of a camera with respect to more than one measured parameter, but only does so with respect to a single set of reference parameters.

It is, therefore, desirable to provide an improved system and/or method to monitor the operation of cameras in a video surveillance system to detect a camera malfunction.

SUMMARY OF THE INVENTION

It is an object of the present invention to obviate or mitigate at least one disadvantage of previous camera monitoring systems and methods.

The present invention addresses problems of conventional approaches by having an automated system that can continuously, or substantially continuously, monitor the health of each camera to a detect a camera malfunction which is due to either external or internal conditions, as described earlier.

In a first aspect, the present invention provides a method of detecting camera malfunction in a digital video surveillance system including the following steps: generating a current camera health record based on current image data; computing a camera health measurement based on a comparison of the current camera health record to a plurality of stored camera health records characterizing known states of normal camera operation; and detecting a camera malfunction when the camera health measurement exceeds a malfunction threshold.

In an embodiment, the malfunction threshold can be exceeded when the camera health measurement exceeds a malfunction severity threshold. The method can further include incrementing a malfunction counter value when the current camera health record is different from each of the plurality of stored camera health records. In that case, the malfunction threshold can be exceeded when the malfunction counter value exceeds a malfunction persistence threshold. The method can further include sending a malfunction indication to a user after the camera malfunction has been detected, the malfunction indication including malfunction information.

The stored camera health records can be based on sets of stored image data obtained in a learning mode. In that case, the method can further include, in the learning mode: obtaining a current learning camera health record based on current image data in the learning mode; computing a learning camera health measurement based on a comparison of the current learning camera health record to a plurality of stored learning camera health records; and storing the current learning camera health record as part of the stored learning camera health records when the learning camera health measurement exceeds a similarity threshold. A match counter can be incremented for a selected stored learning camera health record of the plurality of stored learning camera health records when the current learning camera health record is substantially similar to the selected stored learning camera health record. The stored learning camera health records having the highest match counter values can be retained as the stored camera health records used in camera malfunction detection.

The steps of obtaining, comparing, computing and detecting can be performed for a plurality of cameras and with respect to a plurality of camera-specific health records for each camera.

In an embodiment, the step of generating the current camera health record can include generating an average frame by computing an average luminance of the image data obtained during a reference data generation period. The step of generating the average frame can include computing an average chrominance of the video frames obtained during the reference data generation period. The step of computing the camera health measurement can include computing a number of different pixels by comparing pixels in a current average frame to pixels in a stored average frame, a pixel being determined to be different when an absolute difference of the pixel at the same position in the current average frame and the stored average frame exceeds a pixel comparison threshold. In that case, the step of detecting the camera malfunction can be performed when a percentage of different pixels exceeds a pixel difference percentage threshold.

In another embodiment, the step of generating the current camera health record can include generating an average energy value by calculating a sum of square of all pixels in the average frame. In that case, the step of detecting the camera malfunction can be performed when a comparison of the average energy value of a current average frame to average energy values of a plurality of stored average frames yields a percentage of different average energy values that exceeds an average energy percentage difference threshold.

In a further embodiment, the step of generating the current camera health record can include generating an anchor region by determining a region having a uniquely identifiable energy of frequency components within an average frame. Generating the anchor region can include the following steps: computing an average of all pixels in a candidate anchor region; subtracting the average from each pixel value to obtain a pixel error for each pixel in the candidate anchor region; taking a sum of square values of all pixel errors in the candidate anchor region to obtain a sum of square errors (SSE); and assigning the candidate anchor region to be the anchor region when the SSE is a spatial region maximum SSE and is among the highest SSEs in the average frame. The step of computing the camera health measurement can include: calculating, for each possible position of an anchor-region sized window in a search area, a sum of square errors between reference image pixels in an anchor region and current image pixels in the position in the search area; and storing each sum of square errors in an entry in an anchor region correlation array. The step of detecting the camera malfunction can be performed when the smallest value of the anchor region correlation array expressed as a percentage of a sum of all elements in the array exceeds a correlation threshold.

The step of generating the current camera health record can include generating an image focus level by performing an orthogonal transform on each frame and summing a square value of all non-DC components of the transformed signal. In that case, the step of computing the camera health measurement can include computing an average image focus level for frames acquired during a reference data generation period, and the step of detecting the camera malfunction can be performed when a comparison of the generated image focus level to the average image focus level exceeds an image focus threshold.

In another aspect, the present invention provides a system for automatic camera health monitoring including a camera health record generator, a camera health record comparator, a camera health record manager, and a camera monitor. The camera health record generator generates a camera health record characterizing camera operation. The camera health record comparator compares two camera health records. The camera health record manager stores a plurality of camera health records and arbitrates access to the stored camera health records. The camera monitor is in communication with the camera health record generator, the camera health record comparator and the camera health record manager. The camera monitor initiates a comparison of a current camera health record with a stored camera health record and detects a camera malfunction when a camera health measurement exceeds a malfunction threshold. The camera monitor can compute the camera health measurement based on the comparison of the current camera health record with the stored camera health record.

The system can further include a user interface in communication with the camera monitor to receive a camera malfunction indication in response to detection of the camera malfunction. The camera health record manager can include a camera health record memory to store the plurality of camera health records, or a camera health profile memory to store a plurality of camera health profiles, each camera health profile including a plurality of camera health records.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
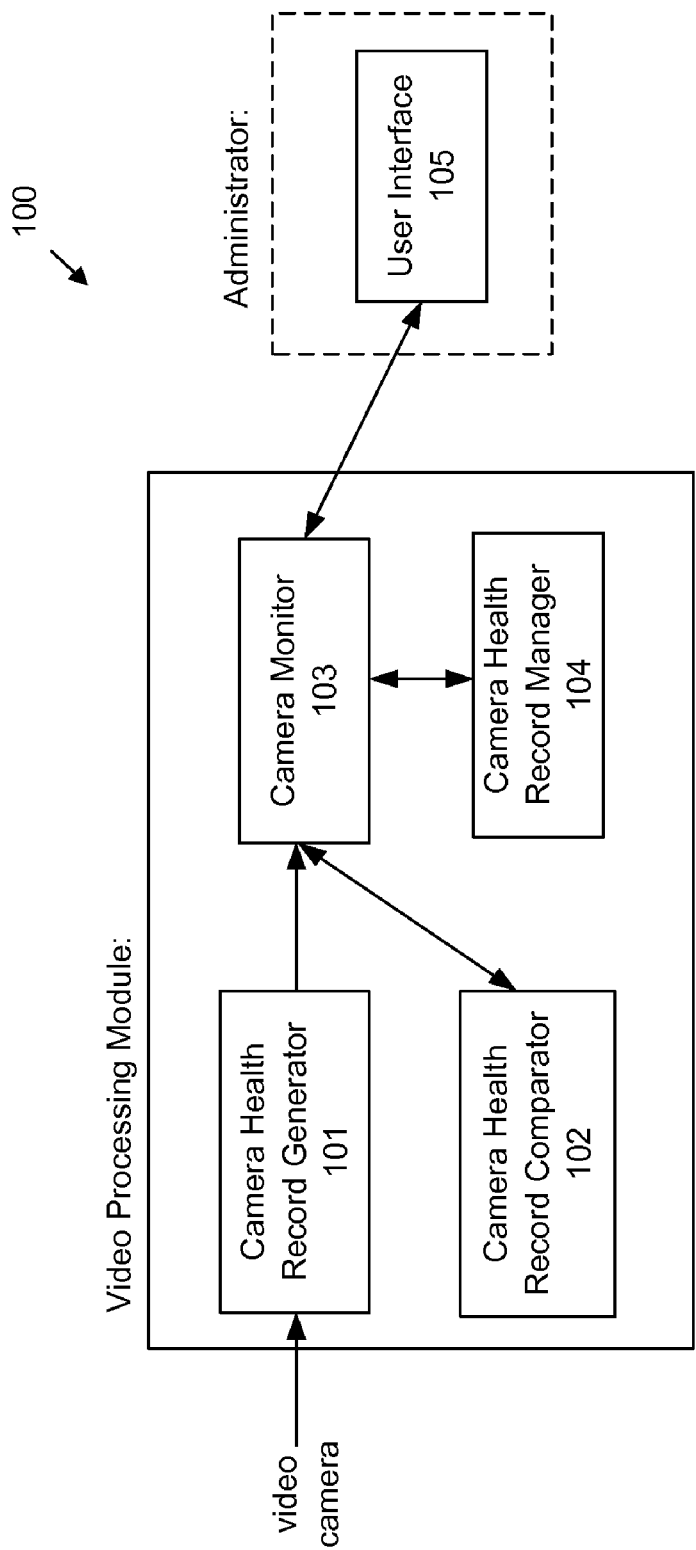
FIG. 1 illustrates a block diagram of a system for automatic camera health monitoring according to an embodiment of the present invention.

Generally, the present invention provides a system and method for automatic camera health monitoring, such as for a camera in a video surveillance system. The system preferably provides substantially continuous monitoring and detection of camera malfunction, due to either external or internal conditions. Camera malfunction is detected when a computed camera health measurement exceeds a malfunction threshold. The camera health measurement is computed based on a comparison of a current camera health record to a plurality of stored camera health records obtained in a learning mode, which characterize known states of normal camera operation. Aside from monitoring camera health, methods of the present invention can also be used to detect an object being added to or removed from a scene, or to detect a change in lighting in a scene, possibly caused by a defective light fixture.

Embodiments of the present invention are preferably implemented in a digital video surveillance system having a plurality of cameras. The video surveillance system can be as simple as a one- or two-camera system observing a home or small business, and can be as complex as a network of multiple interconnected sites at different geographic locations, each site including a plurality of cameras. Cameras can be installed in a wide variety of commercial locations, such as in the retail or financial services sectors, in convenience stores, or in moving vehicles such as in a municipal transportation system or taxi fleet.

An advantage of the invention over known manual approaches is a significant time saving, more considerable as the number of cameras in the video surveillance system increases. As well, the invention preferably monitors the cameras substantially continuously, while a manual approach would only monitor the cameras periodically (e.g. once a week). As such, the present invention can also catch some failures that would not be detected by a periodic check, since a camera failing occasionally might be operating normally at the time of the check.

As well, embodiments of the present invention can be more accurate than existing approaches since they use multiple independent measures to confirm the determination of camera health or detection of a camera malfunction. The present invention monitors the health of each camera to detect a camera malfunction, where the camera malfunction can either be due to external conditions such as obstruction or internal conditions such as camera component failure. This camera malfunction detection is more comprehensive than known approaches, which typically only detect some malfunctions due to external conditions, or other malfunctions due to internal conditions, but not both.

The term "camera health record" is used herein to represent data that characterizes the health and operation of a camera, such as a digital video camera, in a video surveillance system. Each record can be based on or include a set of reference image data acquired from the camera during operation. Stored camera health records characterize known states of normal camera operation. A camera health record preferably includes a plurality of "camera health parameters", each of which can be compared to stored camera health parameters to detect a camera malfunction. A "camera health profile" can include a plurality of camera health records for a particular camera.

A current camera health record is compared with a plurality of stored camera health records in order to determine if the camera is in good "health", or if it is malfunctioning. Determining the health of the camera can be described as determining whether the camera is still looking at the proper scene, and/or whether the camera is functioning properly. In addition to the specific examples discussed herein, camera health monitoring can include detection of externally and internally caused camera malfunction including: camera tamper detection, camera dysfunction detection, camera field of view monitoring, and camera failure detection. The system does not concern itself as much with why the current data is different from the reference data, but simply detects the difference. This provides enhanced functionality and is less computationally expensive.

A plurality of camera health records are kept to properly represent the scene in multiple dynamic conditions (i.e. lighting conditions, level of activity) for each camera. The number of camera health records is configurable, with 6 records being used in a presently preferred embodiment. Each of these dynamic conditions represents a known state of normal camera operation. It is advantageous to have a plurality of camera health records for each camera, since the camera can have a number of known "normal" states that differ from each other, such as due to different lighting conditions throughout the day, or different traffic patterns at different times of day, which may affect focus and obstruction. For a system with a plurality of cameras, the method preferably stores a different camera profile for each camera, with each camera profile including a plurality of camera health records particular to the operating conditions for that camera.

FIG. 1 illustrates a block diagram of a system 100 for automatic camera health monitoring and camera malfunction detection according to an embodiment of the present invention. The system can include a plurality of modules, including logical video processing modules and an optional user interface module as illustrated. The logical video processing modules in FIG. 1 include a camera health record generator 101, a camera health record comparator 102, a camera monitor 103, and a camera health record manager 104. The modules can be provided as part of a video processing module, such as a digital video recorder. An optional user interface module, or user interface, 105 for an administrator can reside on a personal computer (PC) or on any other computer-readable memory. The modules shown in FIG. 1 will now be described in further detail.

The camera health record generator 101, alternatively referred to as a camera health record generation module, is fed with image data such as raw video frames that are acquired for a given camera. The camera health record generator can receive or obtain video frames from a plurality of video cameras, and extract information from these frames over a given period of time (reference data generation period) to generate a camera health record based on image data that represents the operation of each camera. The content of this camera health record is implementation dependent, but it includes information that properly characterizes the current operation and health of the camera based on image data. The camera health record can include a set of reference image data acquired from the camera during operation. The camera health record generator 101 sends its current camera health record for a desired camera to the camera monitor 103, preferably in response to a request from the camera monitor 103. In a presently preferred embodiment, the camera monitor 103 includes the intelligence to perform the steps and functions as described. In an alternate embodiment, the initiation of the request can be performed by other modules, and/or the comparison module can automatically perform a comparison on a scheduled basis.

The camera health record comparator 102, alternatively referred to as a camera health record comparison module, compares two different sets of camera health records to determine whether a camera malfunction has occurred, either due to an external malfunction condition or an internal camera malfunction. Specifically, this can include comparing a current camera health record with a plurality of stored camera health records. A request for this comparison is typically generated by the camera monitor 103 that supplies one of the camera health records to compare. The other camera health record used for the comparison will typically have been previously acquired from the camera health record generator 101. The camera health record comparator 102 determines whether the health of the camera is unchanged, based on comparisons of the different fields of the camera health profile.

The camera monitor 103 can be used in a learning mode to determine whether a current camera health record should be stored as part of the stored camera health records, or whether a match count should be incremented for a particular stored camera health record. In the learning mode, the camera monitor 103 periodically requests a comparison of a current learning camera health record with stored learning camera health records, and computes a learning camera health measurement. When the learning camera health measurement exceeds a similarity threshold, the current learning camera health record is added to the stored learning camera health records. When the learning camera health measurement does not exceed the similarity threshold, a match count is incremented for the learning camera health record to which the current learning camera health record is most similar. At the end of the learning period, the camera monitor 103 preferably keeps from the stored camera health records the records with the most matches and proceeds to normal malfunction detection mode.

In the normal malfunction detection mode, the camera monitor 103, or camera monitor module, periodically requests a comparison of the current camera health record with stored camera health records. A camera health measurement is computed based on that comparison. The camera monitor 103 detects a camera malfunction when the camera health measurement exceeds a malfunction threshold, either by exceeding a malfunction severity threshold or a malfunction persistence threshold. The camera health monitor can send a malfunction indication to the user interface 105 to advise the administrator and advantageously show relevant camera malfunction information, such as malfunction severity and/or malfunction persistence. Malfunction severity can be determined based on the comparison of the camera health measurement to a malfunction severity threshold. Malfunction persistence relies on incrementing a malfunction counter when the current camera health record is different from each of the stored camera health records, and determining that a malfunction persistence threshold has been exceeded when the malfunction counter exceeds the malfunction persistence threshold (i.e. the malfunction persists for the duration of a malfunction period).

After receiving a malfunction indication from the system, an administrator can choose to correct a malfunction as required and then have the camera health monitoring continue for the cameras that have not malfunctioned, and possibly restart a learning period for the camera that malfunctioned. Restarting the learning period is necessary in a case where the repairs have changed the characteristics of the camera. In such a case, the system discards all camera health records that were previously learned for that particular camera.

The camera health record manager 104 stores and retrieves camera health records. The camera health record manager can alternatively be referred to as a camera health record controller, or a camera health record maintenance module. The camera health records learned during the learning period are preferably stored in persistent storage (e.g. hard disk) to preserve data relating to the known normal operating states across power outages. The camera health record manager 104 is responsible for storing this data, and retrieving it upon request from the camera monitor 103. The camera health records are also stored in a memory within, or in communication with, the camera health record manager.

The systems and associated methods described in relation to FIG. 1 use camera health records characterizing camera operation. These camera health records can comprise any number of camera health parameters that suitably characterize normal camera operation in a way that allows easy detection of a camera malfunction as a variation from the normal operation. While these embodiments operate independently of the actual contents of the camera health records, a presently preferred embodiment will now be described with respect to camera health parameters that can be generated and included as part of the camera health records.

Figure 2:
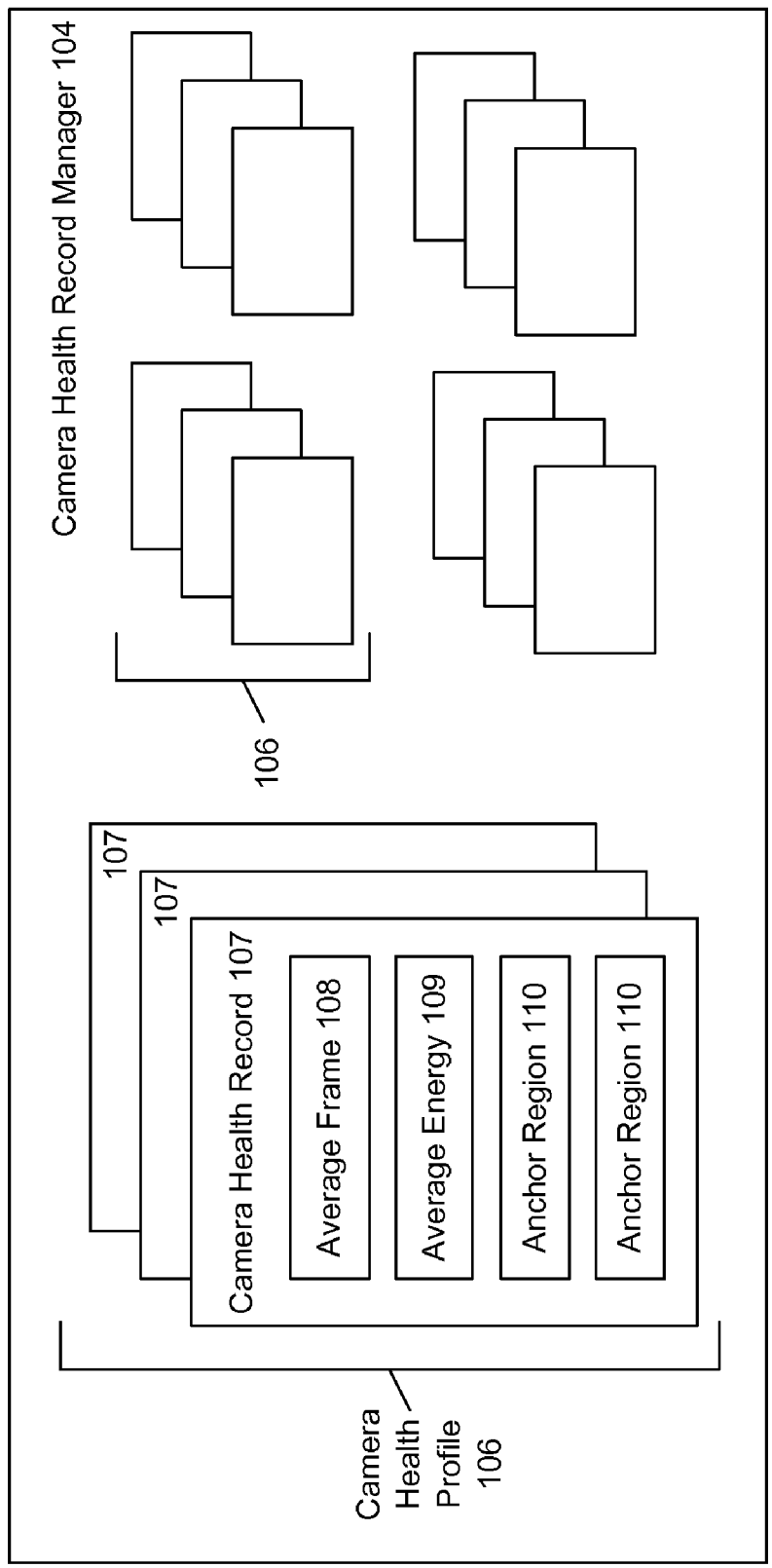
FIG. 2 is a block diagram illustrating camera health record contents according to an embodiment of the present invention.

FIG. 2 is a block diagram illustrating camera health record contents according to an embodiment of the present invention. The camera health record manager 104 (from FIG. 1) is shown in FIG. 2 as storing a plurality of camera profiles 106 for a plurality of cameras, with each camera profile including a plurality of camera health records 107 specific to that camera. In the embodiment of FIG. 3, a selected camera health record 107 is shown as including the following camera health parameters: an average frame 108; an average energy 109; and anchor regions 110.

The average frame 108 is a reduced-resolution frame that is preferably computed as the average luminance of the video frames over the reference data generation period. A reduced-resolution frame is obtained by scaling down the original frame. This is used to reduce complexity of the algorithm, reduce storage requirements and to make the algorithm less sensitive to camera noise and camera vibration. When comparing two sets of reference data, the average frames as described above can be compared by performing a pixel-by-pixel comparison of each pixel in the image. When the absolute difference of pixels at the same position exceeds a pixel comparison threshold (for example 10), then the pixels are counted as being different. The number of pixels that are different is then preferably calculated in terms of percentage of all the pixels in the image. The number of different pixels and/or the pixel difference percentage can be stored as part of the camera health measurement. When a sufficient percentage of pixels differ, then the comparison determines that these are different fields of view and a camera malfunction is detected.

The average energy 109 is the energy of the average frame 108, preferably calculated as the sum of the square of all the pixels in the average frame. When comparing two camera health records, the energy in the two average frames is compared. Average energy difference values such as the average energy difference and/or the percentage average energy difference can be stored as part of the camera health measurement. When the two average energy values differ sufficiently in terms of percentage, then the comparison determines that these are different fields of view and a camera malfunction is detected.

The anchor regions 110 serve as small regions of a frame to be used for future comparisons that determine possible changes of the FOV. An anchor region is a block of pixels that are unique in the image, such that they are easy to match with themselves but unlikely to match with anything else in the scene. Size of the anchor region can be dependent on the resolution of the average frame. In a presently preferred embodiment, a 2×2 anchor region is used for a 44×30 average frame.

An exemplary measure of uniqueness for a potential anchor region is the energy in its frequency components, preferably calculated as follows: compute the average of all pixels in the anchor region; subtract that average from each of the pixel values to obtain a pixel error for each pixel in the anchor region; take the sum of the square values of all pixel errors in the anchor region to obtain a sum of square errors (SSE). This measurement is done in all possible anchor region locations in the average frame.

The local maximum of this measurement can be evaluated in different areas of the image to select potential anchor regions that are spaced apart in the FOV. A presently preferred approach is to separate the image into 12 regions (equal sized regions formed from 4 columns and 3 rows of regions). Once the local maximum has been found in all regions, anchor points are selected from the possible candidates as follows: for any regions that have overlapping anchor search areas (an 8×6 region that surrounds the anchor region), keep only the region with the highest maximum; from all remaining local maximums, select the M anchor regions with the highest values. In the preferred embodiment, M is set to 5. According to these steps, the highest values are taken, and care is taken to ensure that they are well spaced out within the image. These steps can be referred to as assigning the candidate anchor region to be the anchor region when the sum of square errors (SSE) is a spatial region maximum SSE and is among the highest SSEs in the average frame.

Figures 3A, 3B:
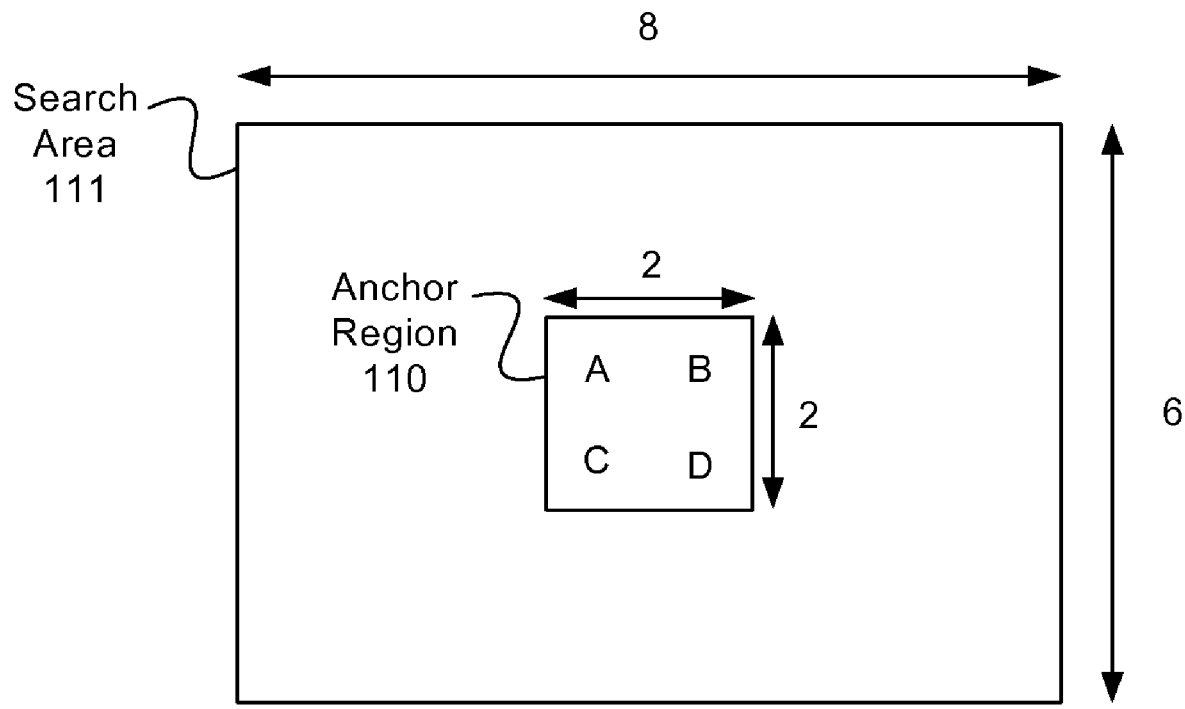
FIG. 3A illustrates an anchor region and a search area according to an embodiment of the present invention.
FIG. 3B illustrates a framework for anchor region correlation measurements according to an embodiment of the present invention.

FIG. 3A illustrates an anchor region and a search area according to an embodiment of the present invention. Correlation measurements will be made for each anchor region 110 in a given search area 111. The size of the search area is chosen to include any movement of the FOV that is deemed acceptable. For the presently preferred embodiment, an 8×6 search area is used for a 2×2 anchor region as depicted in FIG. 3A. Initially, the location of the anchor region is determined and the corresponding pixels in the reference image are found (labeled A, B, C, D in FIG. 3A). The pixels in the anchor region can be referred to as reference image pixels.

FIG. 3B illustrates a framework for anchor region correlation measurements according to an embodiment of the present invention. Initially, all values of an anchor region correlation array, also referred to as an array of sum of square pixel errors, are set to zero. A current image window 112 is moved in all possible positions in the search area. For each of the M anchor regions (M=5 in the presently preferred embodiment), the following calculations are performed: move a 2×2 window in all 35 possible positions in the search area; for each window position, calculate the sum of square errors (SSE) between the reference image pixels (A, B, C, D) and the current image pixels at the current window position; add the calculated SSE to the proper entry of the anchor region correlation array. Each entry in the array can be indexed based on the location of the top-left element in the 2×2 window. In this example, entries 1 and 35 in the array correspond to the data gathered from the top-leftmost and bottom-rightmost boxes in FIG. 3B, as shown in dark lines.

Once the calculations have been completed for all anchor regions, the following steps are performed: find the smallest value in the anchor region correlation array, or sumSSE array; find the overall SSE sum by summing all elements in the sumSSE array; express the smallest value in terms of percentage of the overall SSE sum. When this percentage is above a correlation threshold, then the comparison fails since a suitable match was not found in the acceptable search region. When this is not the case, the comparison succeeds. In a presently preferred embodiment, a correlation threshold of 0.9% is used.

Other measurements can be used to supplement the existing data used for comparisons. Some steps in the methods can be modified or removed without changing the essence of this method, or related system. Examples of supplementary measurements that can optionally be made are camera focus and color accuracy.

Camera focus can be monitored by looking at the energy of the non-DC components of the image. This can give a measure of level of details in the image, which is greater when there is proper camera focus. To measure this, this system can run an orthogonal transform, such as an 8×8 discrete cosine transform (DCT), on each frame and sum the square value of all non-DC components of this DCT. This can then be averaged over all frames acquired during the reference data generation period. This feature can then be compared to detect change of focus by looking for a significant difference of this measurement. This can be described as computing an average image focus level for frames acquired during a reference data generation period and determining that the current reference data matches one of the sets of stored reference data when a comparison of the generated image focus level to the average image focus level exceeds an image focus threshold.

Color accuracy can be monitored by having an average frame that also includes chrominance information. Then it is possible to verify that the color information has not changed significantly from one reference data to the next.

It is possible to use embodiments of the present invention for other applications, such as detecting objects being added or removed from the field of view. For example, when a camera is pointing at a large object that occupies most of the scene, embodiments of the present invention can be used to generate an alert if the object is removed. This can be accomplished by setting a camera malfunction severity threshold that corresponds to detection of removal of the object. The present system and method can also be used to detect a large object that is added to the scene, in a similar manner. This could be used to, for example, detect an object blocking a fire exit.

Lighting changes can also be detected and embodiments of the present invention can be applied to detect when lights are turned on/off in a scene that is monitored by a camera. Data measured in this case can be compared to different camera health records that represent the scene with/without light. This can be used to detect a defective light fixture (i.e. light bulb that has burned out).

Figure 4:
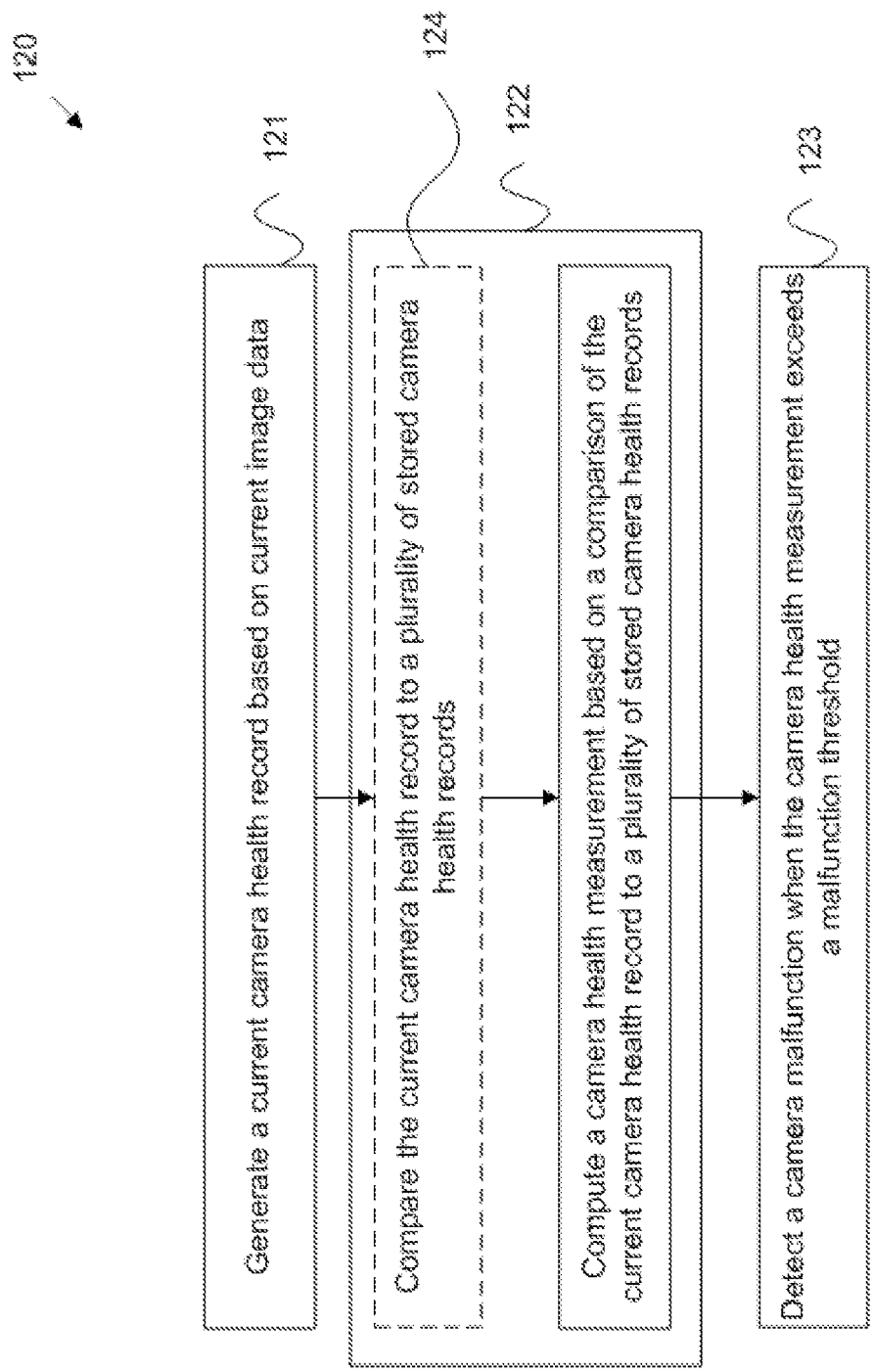
FIG. 4 illustrates a flow chart of a method of camera health monitoring according to an embodiment of the present invention.

FIG. 4 illustrates a flow chart of a method 120 of camera health monitoring and camera malfunction detection according to an embodiment of the present invention. These steps are similar to those described in relation to the operation of the system of FIG. 1 and include: generating a current camera health record based on current image data (step 121); computing a camera health measurement based on a comparison of the current camera health record to a plurality of stored camera health records (step 122); and detecting a camera malfunction when the camera health measurement exceeds a malfunction threshold (step 123). Step 122 is also shown as including the step 124 of comparing the current camera health record to a plurality of stored camera health records characterizing known states of normal camera operation. Step 124 is preferably performed as part of, or substantially concurrently with, step 122, and is therefore shown in dotted lines, since it can be considered to be implicitly included in step 122.

Figure 5:
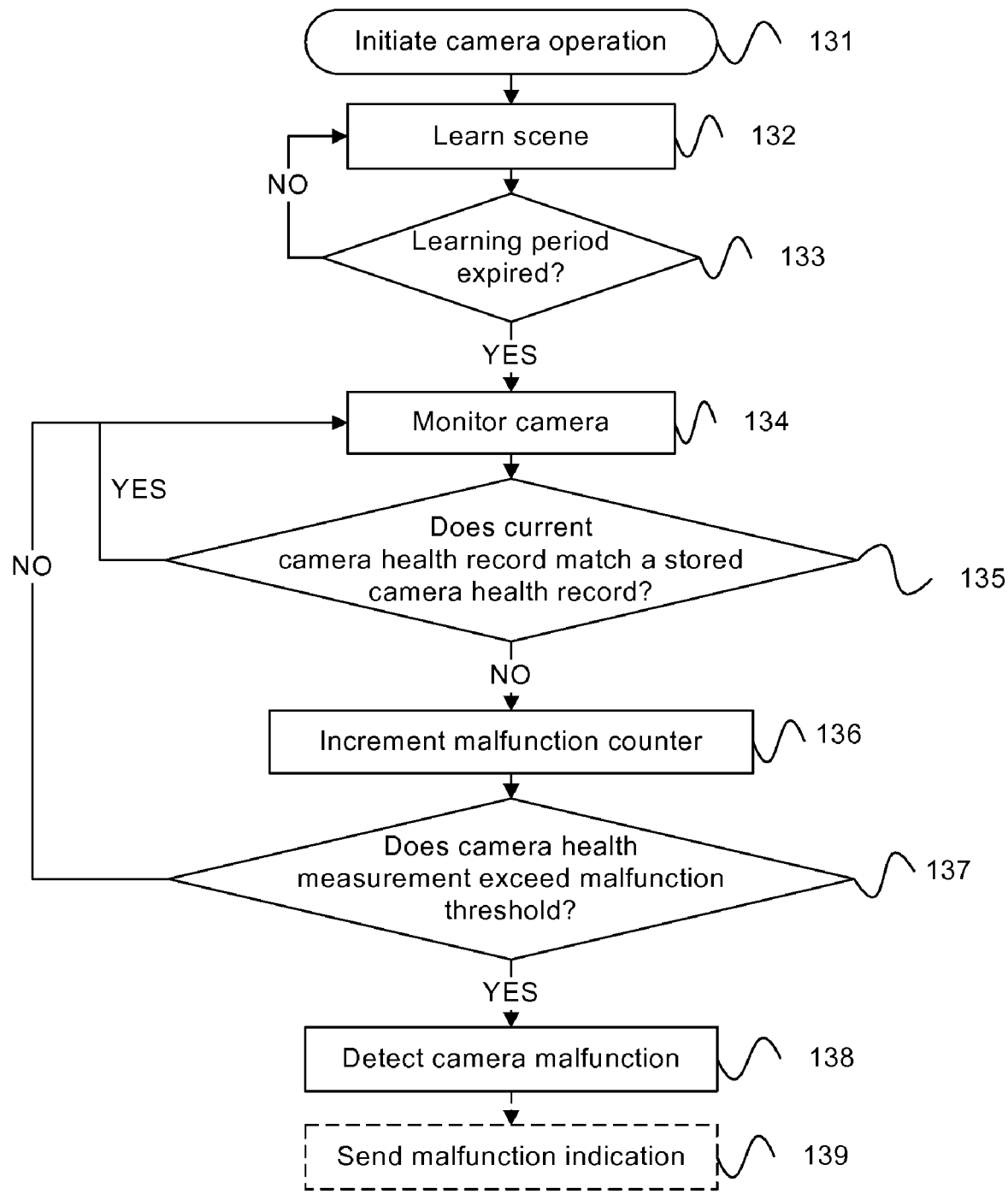
FIG. 5 illustrates a flow chart of a method of camera health monitoring according to an embodiment of the present invention, operating on a given camera.

FIG. 5 illustrates a flow chart of a method of camera health monitoring according to an embodiment of the present invention, operating on a given camera. It is to be understood that the method and system typically operate on a plurality of cameras concurrently, and that this set of steps is performed for each camera. After camera operation is initiated in step 131, the system enters an initial learning mode. As shown in step 132, the camera learns a scene as long as the determination in step 133 is that the learning period has not expired. Once the learning period expires, the system enters normal operation mode and monitors the camera in step 134.

The system performs camera health monitoring and determines in step 135 whether the current camera health record matches, or is substantially similar to, any of the stored camera health records. When there is no match, i.e. the current record is different from the stored records, in step 136 a malfunction counter value is incremented, in order to facilitate a determination in subsequent health monitoring of whether the malfunction counter value exceeds a malfunction persistence threshold. The system then computes a camera health measurement based on the comparison of a current camera health record to a plurality of stored camera health records. Upon determination in step 137 that the camera health measurement exceeds a malfunction threshold, the method proceeds to step 138 where the system detects a camera malfunction.

From step 138, the system can preferably send a malfunction indication as shown in step 139. Once an administrator has been alerted by the system, the administrator can review relevant information that has been sent and decide whether the camera needs to be fixed or serviced. When the camera or its setup has been modified or replaced, learning mode can be restarted by returning to step 132. If no camera modification took place, the method returns to camera monitoring in step 134. The determination of whether to return to learning mode is preferably performed automatically, for example by checking a learning mode restart indicator, which can be set by the administrator, or by comparing a current camera health record under the new camera conditions with the last known camera health record before the malfunction indication was sent.

In summary, the present invention provides a method of generating multiple camera health records to represent various states of normal camera operation during a learning period, and a system for periodic, and preferably substantially continuous, comparison of a current camera health record with a set of stored camera health records, such as based on image data collected during a learning period. According to an embodiment, the present system raises an alert to a user once the system determines with sufficient confidence that a camera is not healthy and a camera malfunction has been detected.

The following parameters are used in a presently preferred embodiment: the camera health record generator computes its average frame over a reference data generation period of 15 minutes; the camera monitor requests camera health records and comparisons at a periodic interval of 30 minutes; the learning period is of 7 days; after the learning period expires, the camera monitor keeps the 6 most popular camera health records; a malfunction indication is generated after 24 hours of consecutive detections of camera malfunction, such as due to non-matches (comparison measurement failures) with all of the camera health records; and the camera health measurement exceeds the malfunction threshold when any of the following is true: energy difference measurement exceeds 50%, percentage of pixels being different exceeds 60%, percentage of pixels being different exceeds 30% and anchor region correlation measurement failed.

In the preceding description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof. With respect to the modules described in relation to FIG. 1, functionality that has been described as being provided in one module can be provided as part of another module in an alternate embodiment.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks. For example, in a system implementation, the video processing modules can reside on a computer readable memory having statements and instructions which, when executed, cause a processor to perform steps of a method of the present invention. Alternatively, the memory can include means for carrying out functionality according to an embodiment of the present invention.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of detecting camera malfunction in a digital video surveillance system, the method comprising:
  generating a current camera health record based on current image data;
  computing a camera health measurement based on a comparison of the current camera health record to a plurality of stored camera health records characterizing known states of normal camera operation; and
  detecting a camera malfunction when the camera health measurement exceeds a malfunction threshold,
  wherein generating the current camera health record comprises generating an anchor region by determining a region having a uniquely identifiable enemy of frequency components within an average frame,
  wherein computing the camera health measurement comprises
    calculating, for each possible position of an anchor-region sized window in a search area, a sum of square errors between reference image pixels in an anchor region and current image pixels in the position in the search area; and
    storing each sum of square errors in an entry in an anchor region correlation array.

2. The method of claim 1 wherein the step of detecting the camera malfunction is performed when the smallest value of the anchor region correlation array expressed as a percentage of a sum of all elements in the array exceeds a correlation threshold.

3. A method of detecting camera malfunction in a digital video surveillance system, the method comprising:
  generating a current camera health record based on current image data;
  computing a camera health measurement based on a comparison of the current camera health record to a plurality of stored camera health records characterizing known states of normal camera operation; and
  detecting a camera malfunction when the camera health measurement exceeds a malfunction threshold,
  wherein generating the current camera health record comprises generating an image focus level by performing an orthogonal transform on each frame and summing a square value of all non-DC components of the transformed signal, and
  wherein computing the camera health measurement comprises computing an average image focus level for frames acquired during a reference data generation period.

4. The method of claim 3 wherein the step of detecting the camera malfunction is performed when a comparison of the generated image focus level to the average image focus level exceeds an image focus threshold.

* * * * *

UNITED STATES PATENT AND TRADEMARK OFFICE
CERTIFICATE OF CORRECTION

PATENT NO. : 7,683,934 B2
APPLICATION NO. : 11/567353
DATED : March 23, 2010
INVENTOR(S) : Christian Joseph Eric Montminy et al.

It is certified that error appears in the above-identified patent and that said Letters Patent is hereby corrected as shown below:

Column 12, line 28, claim 1, delete "enemy" and insert therefor -- energy --.

Signed and Sealed this

Seventh Day of September, 2010

David J. Kappos
*Director of the United States Patent and Trademark Office*